United States Patent
Cowan et al.

(10) Patent No.: US 12,430,286 B1
(45) Date of Patent: Sep. 30, 2025

(54) ENTERPRISE MANAGEMENT WITH INTEGRATION AND VERIFICATION OF DATA BACKUPS

(71) Applicant: Tanium Inc., Emeryville, CA (US)

(72) Inventors: Crispin Cowan, Fall City, WA (US); Samrudh Rajachudamani, Chicago, IL (US); Rory Prendergast, Berkeley, CA (US); Chad Wansing, Buford, GA (US); Andrew Meyer, St. Paul, MN (US); Pedro A. Castro Zevallos, Orlando, FL (US); Christopher Nabkey, Ada, MI (US)

(73) Assignee: Tanium Inc., Emeryville, CA (US)

( * ) Notice: Subject to any disclaimer, the term of this patent is extended or adjusted under 35 U.S.C. 154(b) by 130 days.

(21) Appl. No.: 18/357,094

(22) Filed: Jul. 21, 2023

(51) Int. Cl.
*G06F 16/10* (2019.01)
*G06F 16/11* (2019.01)

(52) U.S. Cl.
CPC .................. *G06F 16/122* (2019.01)

(58) Field of Classification Search
CPC .................................... G06F 16/122
See application file for complete search history.

(56) References Cited

U.S. PATENT DOCUMENTS

| | | | |
|---|---|---|---|
| 8,086,729 B1 | 12/2011 | Hindawi et al. | |
| 8,751,515 B1 * | 6/2014 | Xing | G06F 16/113 707/755 |
| 10,083,095 B1 * | 9/2018 | Chopra | G06F 11/1466 |
| 10,485,536 B2 | 11/2019 | Ming et al. | |
| 10,838,912 B1 * | 11/2020 | Chopra | G06F 11/1458 |
| 10,853,501 B2 | 12/2020 | Brannon | |
| 11,172,470 B1 | 11/2021 | Guieu et al. | |
| 11,258,654 B1 | 2/2022 | Hindawi et al. | |
| 11,343,355 B1 | 5/2022 | Goela et al. | |
| 2019/0155695 A1 * | 5/2019 | Protasov | G06N 3/08 |
| 2019/0361843 A1 * | 11/2019 | Stoddard | G06F 16/1834 |

(Continued)

FOREIGN PATENT DOCUMENTS

WO 2021055268 A1 3/2021

OTHER PUBLICATIONS

"Autodiscovery and manual discovery," Jul. 13, 2023, 5 pages, Web Help for Cyber Protection 23.06, Acronis International GmbH.

(Continued)

*Primary Examiner* — Kristopher Andersen
(74) *Attorney, Agent, or Firm* — Nicholson De Vos Webster & Elliott LLP

(57) ABSTRACT

Techniques are described for integrating a backup service into a management service. A plurality of endpoints are managed with at least one management interface and a particular set of operations are selected based on the one or more backup services identified, the set of operations including: determining differences between a set of data being backed up by the one or more backup services for each endpoint of the plurality of endpoints and data backup requirements for each endpoint, the differences indicating a portion of data of one or more of the endpoints not included in the set of data being backed up; and automatically adding the portion of data to the set of data being backed up by the backup service, wherein adding the portion of data is performed with operations selected based on the one or more backup services.

50 Claims, 7 Drawing Sheets

(56) References Cited

U.S. PATENT DOCUMENTS

2020/0090197 A1 3/2020 Rodriguez et al.
2021/0303515 A1* 9/2021 Brenner .............. G06F 11/1469

OTHER PUBLICATIONS

"Autodiscovery of machines," Jul. 13, 2023, 4 pages, Web Help for Cyber Protection 23.06, Acronis International GmbH.
"CyberGRX Client Services Datasheet," 2023, 2 pages, CyberGRX.
"CyberGRX Framework Mapper Datasheet," 2023, 2 pages, CyberGRX.
"CyberGRX Ransomware Threat Profile and Ecosystem View," 2023, 1 page, CyberGRX.
"Data protection map," Jul. 13, 2023, 2 pages, Web Help for Cyber Protection 23.06, Acronis International GmbH.
"Our world today: increasing IT complexity and vulnerability," 2023, 2 pages, Tanium.
"Predictive Risk Profile," 2023, 4 pages, CyberGRX.
"Protection plans and modules," Jul. 13, 2023, 2 pages, Web Help for Cyber Protection 23.06, Acronis International GmbH.
"Protection status," Jul. 13, 2023, 2 pages, Web Help for Cyber Protection 23.06, Acronis International GmbH.
"Requirements on User Account Control (UAC)," Jul. 13, 2023, 2 pages, Web Help for Cyber Protection 23.06, Acronis International GmbH.
"Selecting components for installation," Jul. 13, 2023, 2 pages, Web Help for Cyber Protection 23.06, Acronis International GmbH.
"Tanium™ Appliance Deployment Guide," Mar. 24, 2023, 264 pages, Version 1.7.5, Tanium.
"Tanium Applicance product brief," 2023, 3 pages, Tanium.
"Tanium Asset," 2023, 2 pages, Tanium.
"Tanium for Asset Discovery and Inventory," 2022, 4 pages, Tanium.
"Tanium™ Integrity Monitor User Guide," Mar. 28, 2023, 106 pages, Version 3.1.9, Tanium.
"Tanium Reveal, Locate and Manage Sensitive Data Across Endpoints to Mitigate Exposure," 2021, 3 pages, Tanium.
"Tanium™ Risk User Guide," Jan. 25, 2023, 55 pages, Version 1.3.128, Tanium.

* cited by examiner

ENTERPRISE MANAGEMENT WITH INTEGRATION AND VERIFICATION OF DATA BACKUPS

TECHNICAL FIELD

One or more embodiments relate to the field of electronic device data backups; and more specifically, to techniques for integrating data backup services in an enterprise management platform, including verification of endpoint backup configurations.

BACKGROUND ART

Among the cybersecurity threats which exist today, Ransomware is a particularly large and growing threat that can be severely damaging and costly to enterprises. To build resilience against ransomware attacks, or similar types of attacks, an enterprise must ensure that all of its "important" data is protected. This is typically accomplished by performing periodic data backups of the data stored on network devices such as network servers and other connected endpoints. For example, an enterprise may subscribe to a backup service and install corresponding backup software on its endpoints. The endpoint software communicates with the backup service via API to perform the backup process and ensure that copies of endpoint data stored on the backup service remain up-to-date.

However, it can be challenging for a large organization to identify all of its important data, which may be distributed across many different types of network devices, and to verify that the latest copies of this data are stored in the backup service. A common approach to testing backups is to attempt a full data restore. While a successful data restore verifies that the current backups are working correctly, it does not confirm that all important data has been correctly identified and included in the backup operations. Enterprises often learn that their backup coverage was inadequate only when their data is actually compromised, and they cannot recover all of it.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

DETAILED DESCRIPTION

Figure 1A:
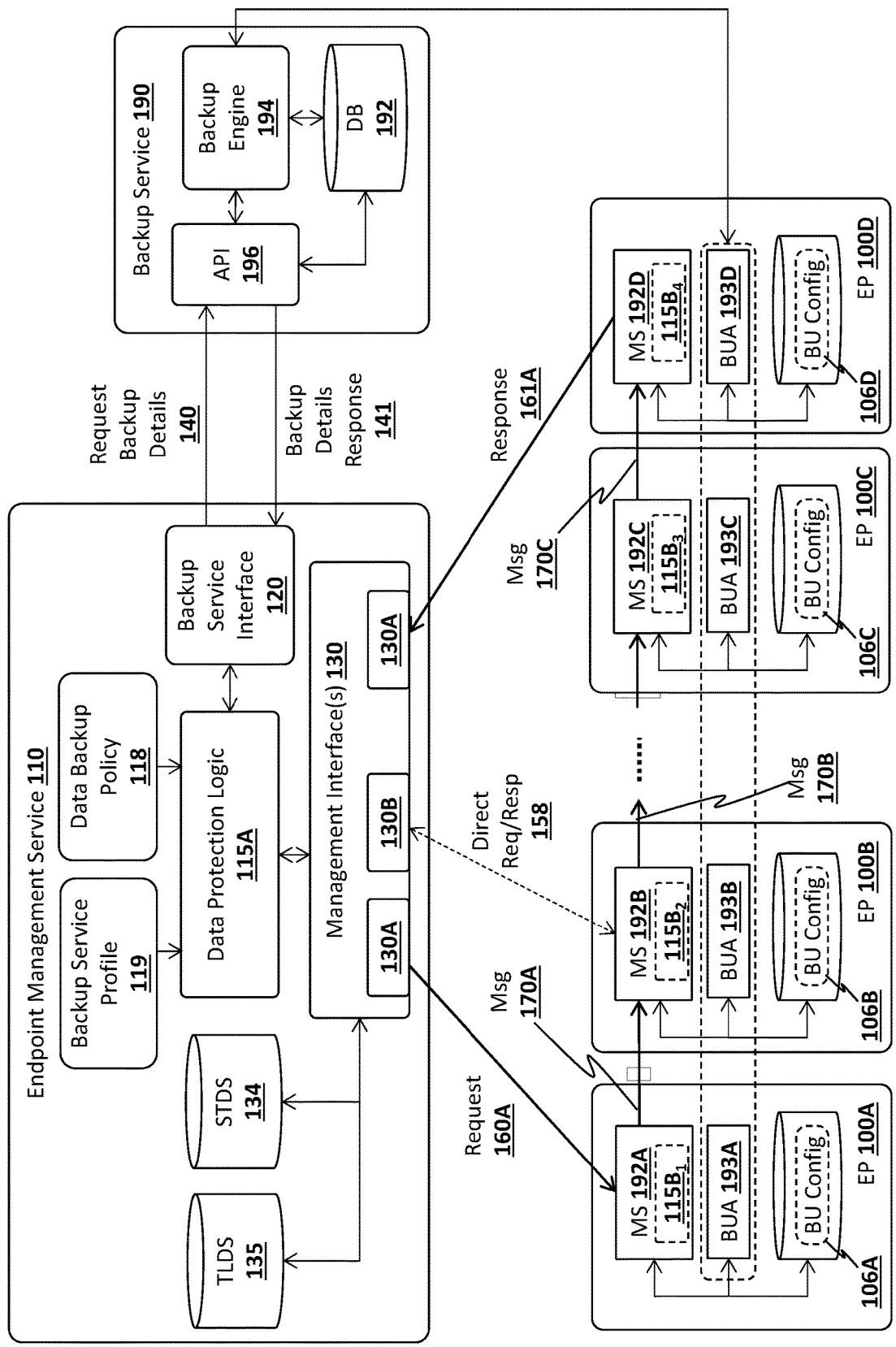
FIGS. 1A-C illustrate implementations of a backup service integrated within an endpoint management service.

Embodiments of the invention described below include an endpoint management service which is configurable to integrate with different third-party backup services to provide greater control over the data backups performed, including the endpoint data to be included in backups. In these embodiments, the endpoint management service includes various configurable interfaces and logic to determine and modify the scope of the data backups being performed. Determining the scope of current backups may be performed through communication with the endpoints and/or through direct communication with the backup service (e.g., via a backup service API). These embodiments can be configured to operate with different backup services by automatically selecting the correct set of communication protocols required to query and control each backup service.

There are existing endpoint backup systems which are capable of identifying files that are excluded from a backup. However, these systems are based on a monolithic architecture which supports backups and security, whereas the embodiments of the invention include an endpoint management architecture which is automatically configurable to integrate with third-party backup services. This difference is significant in that a single integrated architecture does not need to consider interoperability with different backup protocols since they control the entire platform.

In addition, these systems offer only rudimentary mechanisms for determining files to be backed up (e.g., based on parameters such as file type) and these determinations are made manually by an administrator. These systems are not capable of monitoring file usage at endpoints, evaluating the content of the files, and/or recognizing larger constructs (e.g., databases, virtual machines, containers), and then making backup decisions based on this information.

In one implementation, the types of endpoint data and/or specific instances of endpoint data which should be backed up are specified in a data backup policy. After establishing the required communication channels with the backup service and/or endpoints, the endpoint management service determines the scope of current data backups (e.g., the specific endpoint data being backed up) and compares this data with the data indicated by the data backup policy. If the endpoint management service determines that certain types of data indicated by the backup policy are not included in the current data backups, the endpoint management service may perform various actions including generating notifications (e.g., identifying the unprotected data to an administrator) and/or automatically configuring the backup service to resolve the problem (e.g., configuring the backup service and/or the individual endpoints to include the unprotected data in the periodic backups).

One embodiment of the endpoint management service includes an autonomous mode of operation which identifies at least some of the "important" data to be included in the backup policy. For example, the endpoint management service may evaluate management data collected from the endpoints to identify certain portions of the endpoint data to be added to the regular backup. By way of example, and not limitation, data with certain identifiable characteristics such as certain keywords or data which is subject to frequent modifications may be added to the backup.

FIG. 1A illustrates one embodiment of an endpoint management service 110 with at least one management interface 130 for communicating with a plurality of endpoints 100A-D on which endpoint management software 192A-D, respectively, is installed. In one embodiment, data protection logic 115A running on the management service 110 and/or data protection logic 115B$_{1-4}$ on each endpoint 100A-D performs the operations described herein to ensure that endpoint data is backed up in accordance with the organization's data backup policy 118. The data protection logic 115A and/or 115B$_{1-4}$ determines the endpoint data currently being backed up by reading backup configuration files 106A-D of endpoints 100A-D, associated with one or more backup services, such as backup service 190, and/or communicating with the backup services 190 via corresponding APIs 196 exposed by the backup services.

Each management interface 130 communicates with the endpoint management software 192A-D in accordance with a particular management protocol. One particular embodiment of a management interface 130 comprises a linear chain interface 130A which transmits requests and receives responses from the endpoint management software 192A-D in accordance with a "linear chain" or "linear orbit" protocol. Note, however, that the underlying principles of the invention are not limited to any particular type of management interface or management protocol. The management service 110 may be configured to operate in a variety of environments including, but not limited to, a server in a cloud-based platform and a server on a private network.

There are many variations on the linear chain approach that may be used by the management interface 130. Briefly, in a linear chain approach, the various instances of the endpoint management software 192A-D collectively operate to form a linear chain (also referred to as a ring, neighborhood, chain, arc, series, propagation, propagation channel) between the managed endpoints 100A-D. While a single set of managed endpoints 100A-D are illustrated for simplicity, hundreds or thousands of endpoints may be similarly configured with endpoint management software to implement many additional linear chains. Moreover, while only four endpoints 100A-D are shown in FIG. 1A, a plurality of additional endpoints may be included in the linear chain (i.e., as indicated by the dotted line between endpoints 100B and 100C). In a linear chain configuration, rather than a management service communicating directly with client software on each managed endpoint 100A-D, a management request 160A directed to a first endpoint 100A, causes a sequentially-updated message 170 to be passed from the first endpoint 100A along a sequence of other endpoints 100B-D in the linear chain, collecting and aggregating data as it passes through each endpoint.

The messages passed between endpoints 100A-D can be viewed as a single message 170 which is updated with additional data at each endpoint 100A-D or separate messages 170A-C transmitted from each endpoint and updated with the data from all previous messages. In either case, once all requested data has been collected from the endpoints 100A-D, the last endpoint 100D in the chain transmits the response message 161A to the management interface, containing the requested management data (e.g., in an aggregated and/or compressed format) from all endpoints in the chain.

In addition to the techniques described here, a linear chain may also be implemented as described in: application Ser. No. 16/854,844, issued as 11,172,470, and titled System, Security and Network Management Using Self-Organizing Communication Chains in Distributed Networks; application Ser. No. 15/686,054, issued as 10,485,536, and titled Fast Detection and Remediation of Unmanaged Assets; application Ser. No. 16/917,800, issued as 11,258,654, and titled Parallel Distributed Network Management; and application Ser. No. 16/943,291, issued as 11,343,355, titled Automated Mapping of Multi-Tier Applications in a Distributed System, all of which are assigned to the assignee of the present application.

The management interfaces 130 may additionally, or alternatively, include a direct endpoint connection (DEC) interface 130B to directly communicate with specific endpoints over the local network. In FIG. 1A, for example, the DEC interface 130B makes a direct connection to the management software 192B running on endpoint 100B. In one implementation, a direct connection is used to retrieve relatively larger amounts of endpoint-specific data sets (e.g., when additional data is needed to perform a more in-depth analysis of certain endpoints). For example, the linear chain interface 130A may be used to collect relatively lower cardinality data, including data with significant duplication between endpoints (e.g., data which can be filtered/compressed using the linear chain and/or virtual linear chain) and the DEC interface 130B may be used to collect relatively higher cardinality data, such as a large set of endpoint-specific data (e.g., data with little or no duplication).

One implementation of the endpoint management service 110 maintains a short term data store 134 to store the data collected from the various endpoints and a long term data store 135 such as a database or other persistent storage device. The short term data store 134 may be an in-memory data store (e.g., an in-memory cache) containing a subset of the endpoint data, such as the most recently collected, most recently used, or most relevant endpoint data, which can be accessed from memory or cache at relatively low latency and high throughput. The long term store 135 stores all endpoint data (e.g., collected over a relevant period of time) or a filtered subset of the endpoint data (e.g., with redundancies removed to improve storage efficiency). The management service 110 or other authorized software may read any endpoint data from the long term data store 135 when needed (e.g., for analysis or viewing). Once read, the data may be temporarily cached in the short term data store 134 (e.g., in accordance with a data management policy such as a least-recently used or most frequently used policy, which keeps the most recently or most frequently used data in the short term data store 134).

In the illustrated embodiment, a backup agent 193A-D installed on each respective endpoint 100A-D connects the endpoint to the backup service 190. In particular, once installed and authenticated (e.g., with a user name and password), each backup agent 193A-D establishes a connection with a backup engine 194 based on a defined schedule and/or other variables. The specific backup configuration including an indication of the endpoint data to be backed up, the backup schedule, and/or the events which trigger a new backup are specified in a backup configuration file 106A-D on each respective endpoint 100A-D. In these embodiments, each backup agent 193A-D reads a corresponding backup configuration file 106A-D to determine what and when to perform backups for the respective endpoint 100A-D. After connecting to the backup service 190, each backup agent 193A-D transmits selected portions of the corresponding endpoint data to the backup engine 194, which stores the endpoint data in a database 192 or other persistent data storage. In many implementations, the backup agents 193A-D track changes to data files stored in the corresponding endpoint's local file system and only transmit data or data files which have changed since the last backup (e.g., modified files, identifying deleted files, etc), rather than performing a full backup each time.

Other backup implementations do not store a backup configuration file (or at least not one which is accessible) on endpoint devices. In these implementations, the backup operations are fully configured on the backup service 190, which communicates with the various backup agents 193A-D to determine the frequency and scope of backups.

In one embodiment, data protection logic 115A running on the management service 110 and/or data protection logic $115B_{1-4}$ on each endpoint 100A-D performs the operations described herein to ensure that endpoint data is backed up in accordance with the organization's data backup policy 118. The data protection logic 115A and/or 115B$_{1-4}$ determines the endpoint data currently being backed up by reading backup configuration files 106A-D of endpoints 100A-D, respectively, and/or communicating with the backup service 190 via an exposed API 196.

Each backup service (of which backup service 190 is an example) may be associated with a unique backup service profile 119 comprising metadata indicating capabilities and/or characteristics of the backup service. The backup service profile 119, for example, may indicate whether the backup service exposes an API (such as API 196), if backup configuration files 106A-D are used and accessible on the endpoint devices 100A-D, and/or if the backup settings can be modified via the API 196 or the backup configuration files 106A-D. Thus, when the data protection logic 115A, 115B$_{1-4}$ is initialized for a new backup service 190, it operates in accordance with the backup service profile 119 to access and/or make changes to the current backup settings.

In some embodiments, the data protection logic 115A uses one or more of the management interfaces 130 to communicate with the endpoints 100A-D. For example, the data protection logic 115A may transmit queries to read from the backup configuration files 106A-D via the linear chain interface 130A and/or the direct endpoint connection interface 130B. The corresponding management software 192A-D on each endpoint 100A-D (or specifically the data protection logic 115B$_{1-4}$) processes the queries, reading the backup data from the corresponding backup configuration files 106A-D. Similarly, the data protection logic may use the management interfaces 130 to transmit commands to update the backup configuration. The commands are processed by the data protection logic 115B$_{1-4}$ on each respective endpoint 100A-D to update the corresponding backup configuration files 106A-D. In some embodiments, the data protection logic 115A connects directly to individual endpoints to access the backup configuration data (i.e., rather than relying on the management interfaces 130).

In some embodiments, the data protection logic 115A communicates over a backup service interface 120 to query the backup service 190 via the API 196 rather than retrieving the backup configuration from each individual endpoint 100A-D (e.g., as indicated by backup details request 140). If such requests are permitted, the backup engine 194 generates a response 141 containing backup details indicating the backup configuration of each endpoint 100A-D.

The management service 110 may select a different backup service interface 120 based on the identity of the backup service in use, thereby allowing the data protection logic 115A to access different backup services with different APIs (such as API 196), as indicated by corresponding backup service profiles 119.

In one embodiment, determining whether all "important" data is being backed up comprises the operations of determining the important data; determining the data being backed up; comparing the important data to the backed up data to determine the delta; and causing the delta to be included in the backup. In various embodiments, these operations may be performed by any combination of the data protection logic 115A on the management service 110, data protection logic 115B$_{1-4}$ on the endpoints 110A-D, and/or the backup service 190.

Figure 1B:
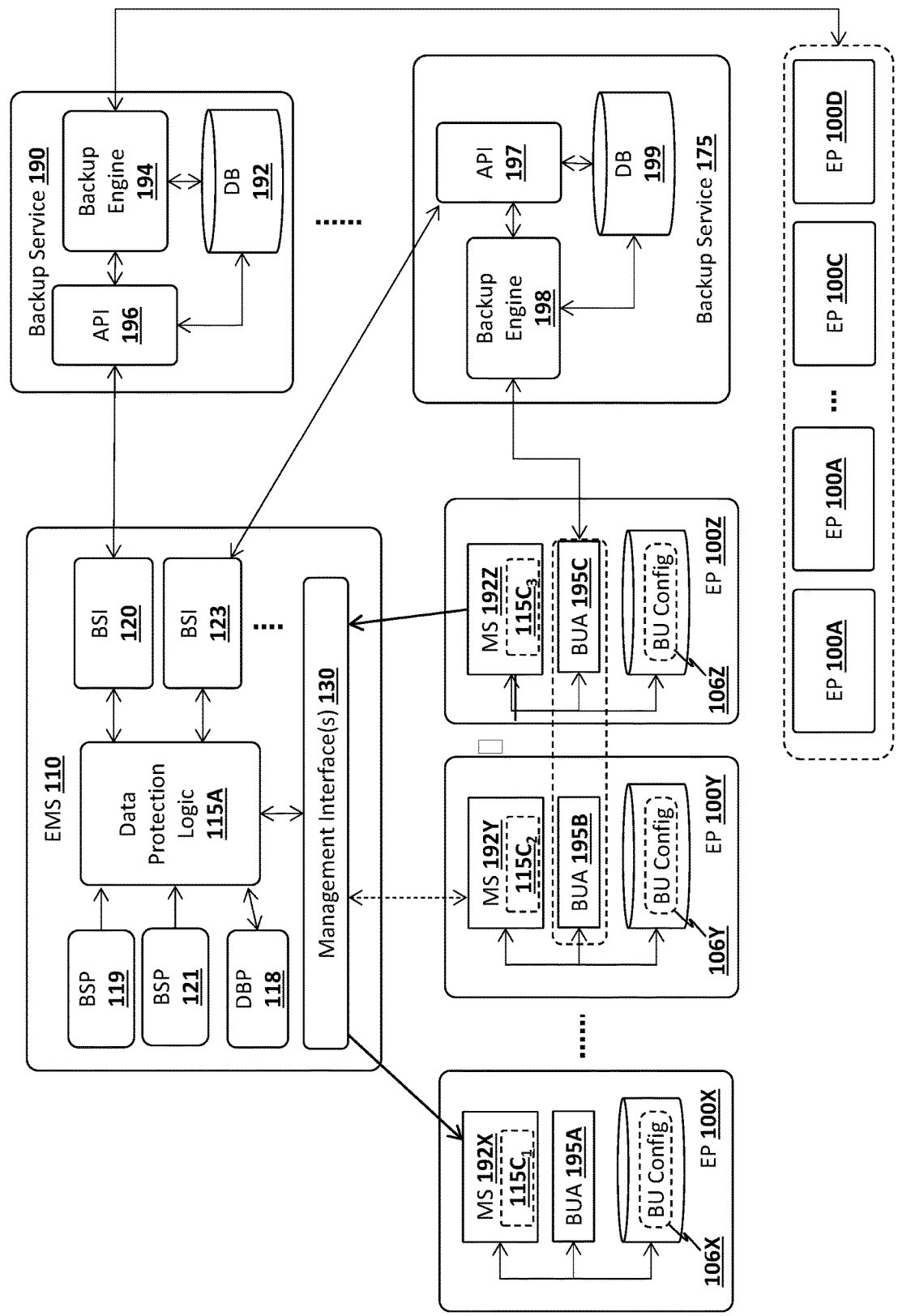

As mentioned, the data protection logic 115A running on the management service 110 and/or data protection logic 115B$_{1-4}$ on each endpoint 100A-D may interface with a diverse variety of backup services within a single enterprise, so that endpoint state can be protected across several backup providers. FIG. 1B illustrates a specific example in which an additional backup service 175 (in addition to backup service 190 described with respect to FIG. 1A) performs backups for another set of endpoints 100X-Z (in addition to endpoints 100A-D) within the same enterprise.

Data protection logic 115A running on the management service 110 and/or data protection logic 115C$_{1-3}$ provided by management software 192X-Z of the endpoints 100X-Z interacts with data backup service 175 in accordance with a corresponding backup service profile 121 comprising metadata indicating capabilities and/or characteristics of the backup service 175. Like the backup service profile 119 for backup service 190, the backup service profile 121 for backup service 175 may indicate whether the backup service exposes an API 197, if backup configuration files 106X-Z are used and accessible on the endpoint devices 100X-Z, and/or if the backup settings can be modified via the API 197 or the backup configuration files 106X-Z. Thus, when the data protection logic 115A, 115B$_{1-4}$ is initialized for a new backup service 190, it operates in accordance with the backup service profile 119 to access and/or make changes to the current backup settings.

Thus, when the data protection logic 115A, 115B$_{1-4}$ is configured to interoperate with an additional backup service 175, it operates in accordance with the backup service profile 121 to access and/or make changes to the current backup settings for the endpoints backup up by that backup service 175. For example, if backup service 175 does not expose an API 197, then data protection logic 115C$_{1-3}$ on endpoints 100X-Z determines the current backup configuration from backup configuration files 106X-Z on endpoints 100X-Z. If an API 197 is exposed, then a separate backup service interface 123 is configured in accordance with the backup service profile 121 to allow the data protection logic 115A to directly request backup configuration data and make backup configuration changes.

As with the example in FIG. 1A, the enterprise management service 110 manages endpoints 100X-Z in accordance with a particular management protocol which can include, for example, a linear chain protocol and/or a direct endpoint connection protocol. While only two backup services 190, 175 are illustrated in FIG. 1B, the data protection logic 115A, 115B$_{1-4}$ is configurable to operate with a diverse set of additional backup services.

Figure 1C:
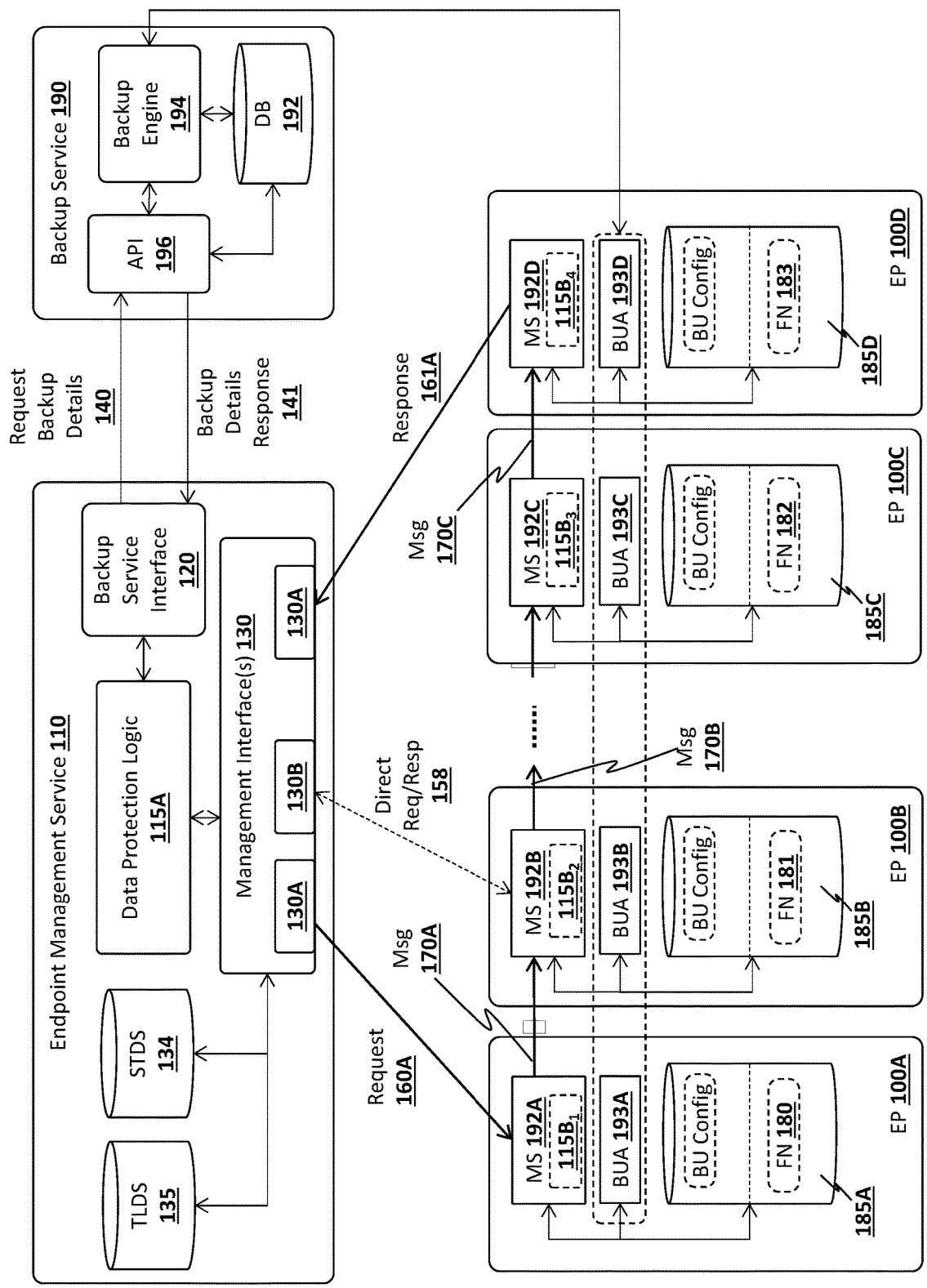

To compare whether chunks of state have or have not been backed up, the chunks of state must be uniquely identified, in terms that can be extracted from the various backup service providers 175, 190. Given that a diverse set of backup providers will use diverse techniques to identify chunks of state, one embodiment of the invention normalizes these identities. Referring to FIG. 1C, this embodiment inserts a file (which can be empty) with a unique file name 180-183 (such as a GUID) into each volume 185A-D of each endpoint which needs to be backed up. While a volume is used here as an example, files with unique file names may be inserted at various levels of granularity including, for example, specific folders or portions of volumes.

Subsequently, when evaluating the data backed up by one or more backup service providers 175, 190, the data protection logic 115A may search for each file to uniquely identify and verify the backed-up state. For example, if a file with a unique file name is inserted in a particular volume, and that file is identified in the backed-up data via its unique file name, this is an indication that the volume was backed up. The file need not be zero-length, because it can be enhanced to contain useful information such as the date the file was last backed up and the date the volume was last compared to the backup service.

Figure 2:
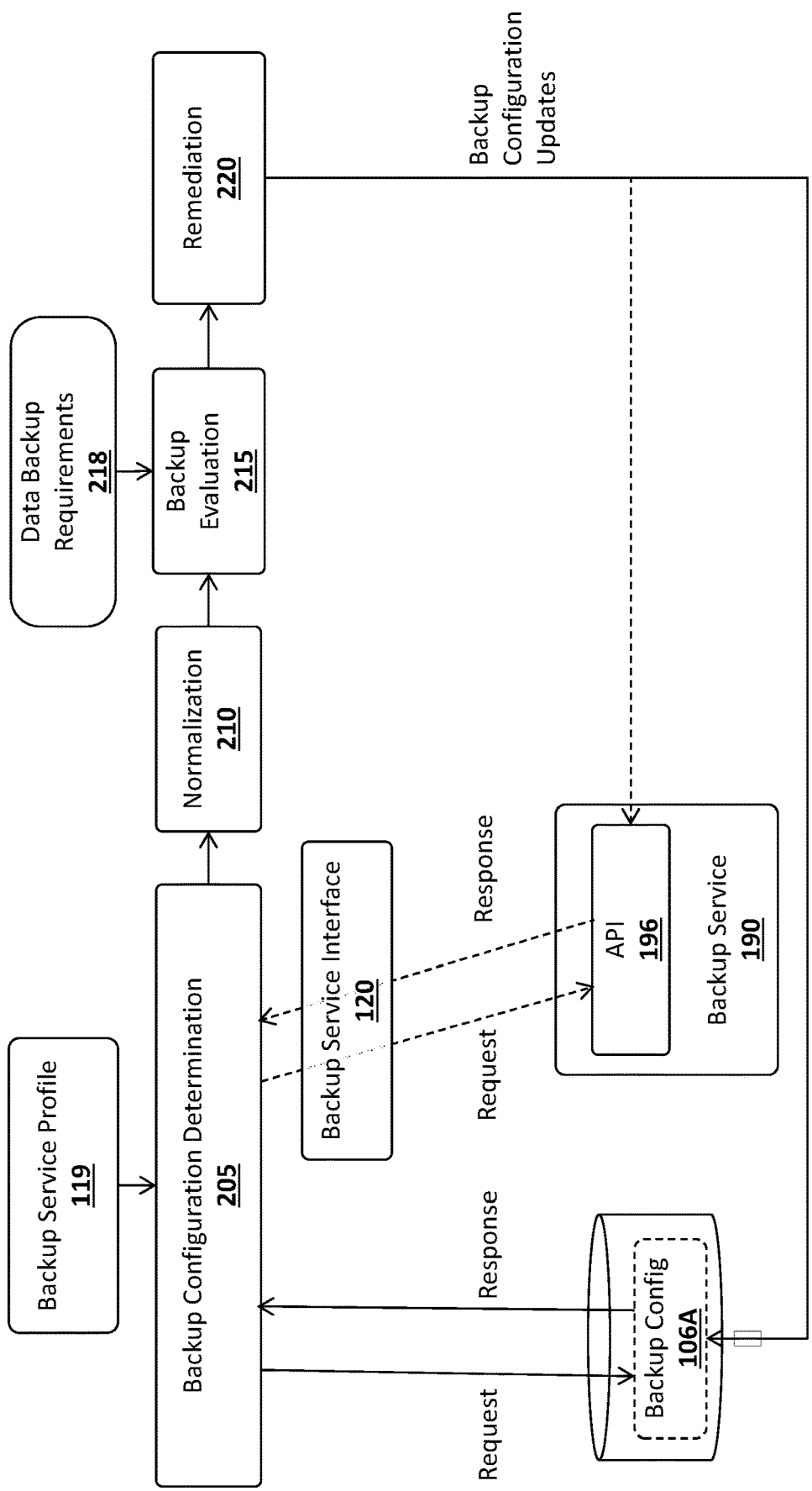
FIG. 2 illustrates a group of functional components in accordance with some embodiments of the invention.

FIG. 2 illustrates functional components for performing these operations including backup configuration determination logic 205, normalization logic 210, backup evaluation logic 215, and remediation logic 220, which may be implemented on any combination of the data protection logic 115A on the management service 110, data protection logic 115B$_{1-4}$ on the endpoints 110A-D, and/or the backup service 190.

Backup configuration determination logic 205 determines the endpoint data currently being backed up, either by reading configuration data directly from endpoint backup configuration files 106A and/or from the backup service 190 itself via the API 196. While not shown in FIG. 2 for simplicity, the backup configuration determination logic 205 may rely on a management interface (e.g., interfaces 130A, 130B) to access the backup configuration files 106A.

Optionally, normalization logic 210 normalizes the backup configuration data into a data format which can be compared with the data backup requirements 218 (i.e., the "important" data as previously described). For example, the backup configuration data 106A may be provided in a first metadata format which the normalization logic 210 transforms into a second metadata format used for indicating the data backup requirements 218.

In one embodiment, backup evaluation logic 215 compares the normalized backup configuration data with the data backup requirements 218. The delta between the current backup configuration and the data backup requirements may be sent in a notification to an administrator and/or provided to remediation logic 220. As mentioned, the backup evaluation 215 may be performed by the data protection logic 115A on the endpoint management service 110 and/or the data protection logic 115B$_{1-4}$ on the various endpoints 110A-D. In the latter case, the endpoint management service 110 may send each endpoint 110A-D a copy of the data backup requirements 218 so that the data protection logic 115B$_{1-4}$ can perform the comparison.

In one embodiment, the remediation logic 220 automatically updates the current backup configuration to include the delta. For example, the remediation logic 220 may transmit messages to update the backup configuration of each endpoint (e.g., updating the backup configuration file 106A on endpoint 100A) and/or instructing the backup service 190 to update the endpoint backup configuration via the exposed API 196. In some embodiments, the remediation logic 220 may de-normalize the backup configuration data (e.g., converting the data back to the first metadata format) prior to updating the configuration files or performing messaging via the API 196. In an embodiment in which the backup evaluation 215 is performed by data protection logic 115B$_{1-4}$ on each endpoint, then the remediation 220 may also be performed by the data protection logic 115B$_{1-4}$, which updates each respective backup configuration file 106A-D accordingly (i.e., to include the delta in subsequent backups).

Figure 3:
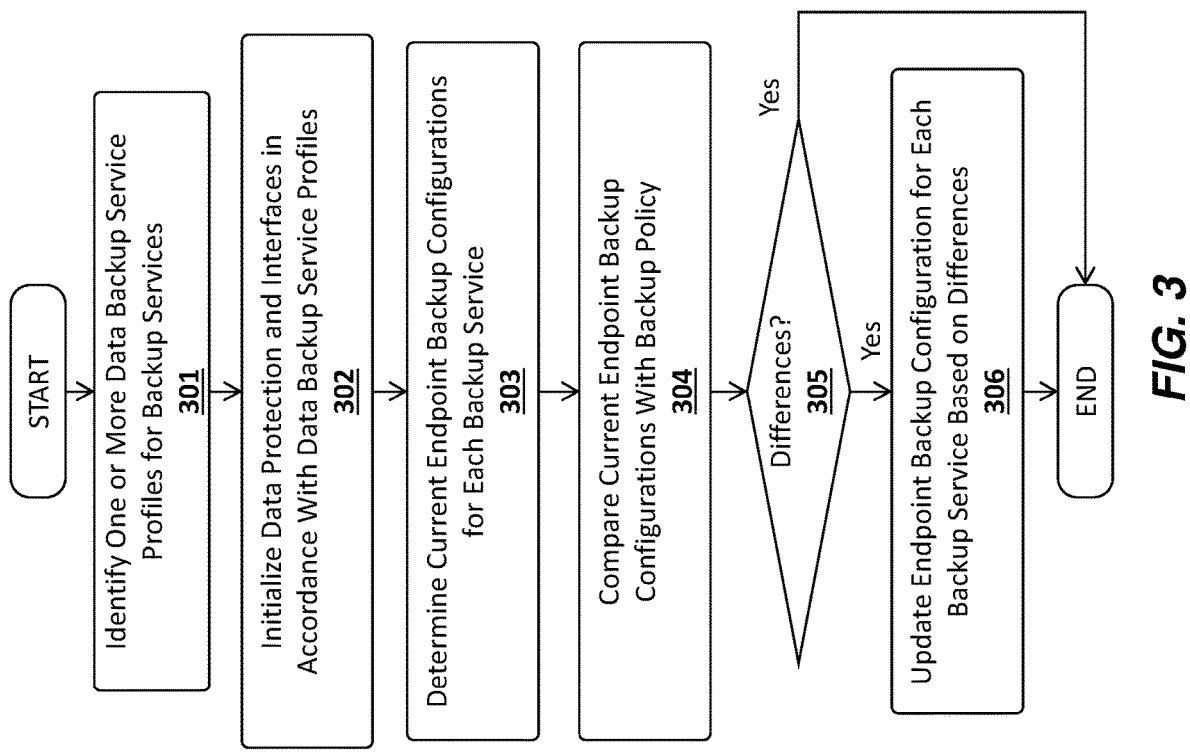
FIG. 3 illustrates a method in accordance with some embodiments of the invention.

FIG. 3 illustrates a method in accordance with one embodiment of the invention. The method may be implemented within the context of the various architectures described above, but is not limited to any particular system or service architecture.

At 301, one or more data backup service profiles are identified, which include an indication of how to perform the various operations described herein based on the characteristics of each respective data backup service. For example, the profile of each data backup service may indicate how the management service should communicate with the data backup services and/or the corresponding endpoints. At 302, the logic and any required interfaces are initialized on the endpoint management service and/or the endpoints based on the one or more data backup service profiles (e.g., such as initializing the data protection logic 115A, 115B$_{1-4}$).

At 303, the current backup configuration for each endpoint is determined. Depending on the backup service, this can be accomplished by communicating with the endpoints (e.g., reading the backup configuration files stored on the endpoints) and/or communicating directly with the backup service API. As mentioned, the manner of determining the current backup configuration may be specified in the corresponding backup service profile for each backup service. At 304, the current endpoint backup configuration associated with each backup service (and for each respective endpoint) is compared with the desired backup configuration specified in the organization's backup policy to identify any differences. As mentioned, the comparison may be performed by the data protection logic 115A running on the management service 110 and/or the data protection logic 115B running on the individual endpoints. In the latter case, the data protection logic 115A transmits an indication of the desired backup configuration to each endpoint 110A-D and the corresponding instances of the data protection logic 115B$_{1-4}$ determine the differences. In these embodiments, the desired backup configuration may be endpoint-specific or may be the same for all endpoints 100A-D.

The desired backup configuration may be specified at a specific data granularity such as endpoint drives, volumes, folders, files, and/or larger constructs such as virtual machine, containers, and databases. In some embodiments, the data granularity is configurable such that subsets under a particular category may be individually selected or excluded from backups. For example, rather than backing up entire "volumes", specified portions of volumes may be identified (e.g., C:Usersalicedocuments important_stuff). In addition to the specific data identified, backup timing parameters may be indicated for each type of data. For example, certain types of data may require hourly backups while other types of data may require only daily or weekly backups. Thus, when the comparison is made between the current endpoint backup configuration and the desired backup configuration, both the data being backed up and the timing associated with backups is compared to identify differences.

If differences are identified at 305, then at 306 the endpoint backup configuration is updated to include the differences. For example, any data which was missing from the current backup configuration for each backup service is added to the current backup configuration files 106A-D of each respective endpoint 100A-D. With respect to timing, the frequency of data backups for certain types of data (or all data) may be modified. In an embodiment in which the comparison is performed by the data protection logic 115B$_{1-4}$ on the endpoints 100A-D, the data protection logic 115B$_{1-4}$ may automatically update the corresponding backup configuration files 106A-D. Depending on the identities of backup services, this may alternatively or additionally require the data protection logic 115A of the management service 110 transmitting a request to the backup services 190, 175 to add the difference data to its regular backups. The backup service 190, 175 then communicate with its backup agents 193A-D to implement the changes.

Figure 4:
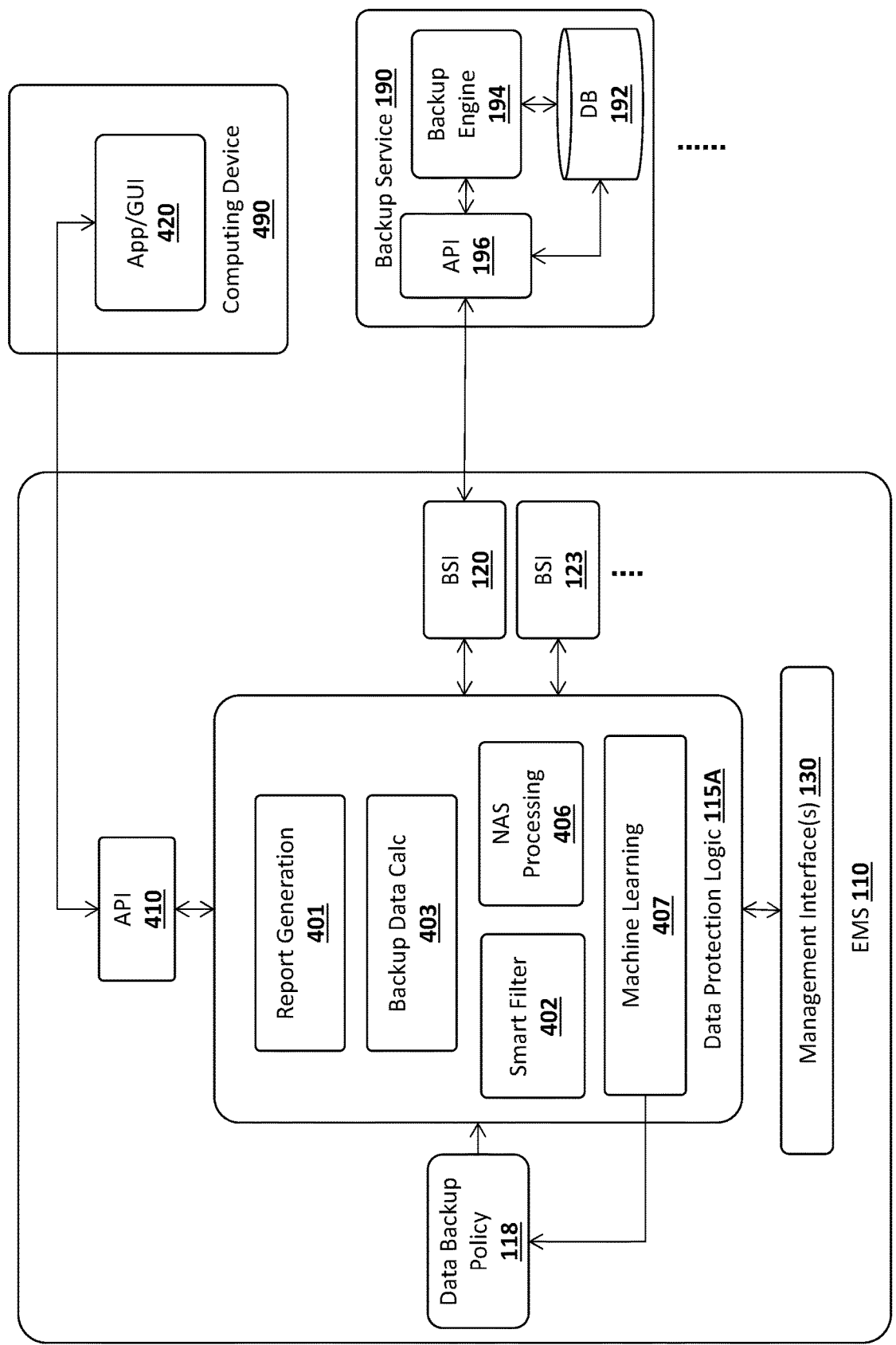
FIG. 4 illustrates additional details of one embodiment of the invention.

Referring to FIG. 4, when determining current backup configurations, such as the scope of the data currently backed up, embodiments of the data protection logic 115A include NAS processing logic 406 to detect data in network-attached storage (NAS) and other network devices which are incapable of independently supporting management software. The NAS processing logic 406 determines the data stored on these devices by scanning for network-mounted storage on endpoints which are running instances of the management software (e.g., 192A-D, 192X-Z described above). In these implementations, the NAS processing logic 406 may assign identifiers to uniquely differentiate these network storage servers.

One embodiment of the data protection logic 115A also includes backup data calculation logic 403 which uses the raw backup data collected from the various endpoints to generate additional useful metrics related to data backups. For example, at certain granularities, such as files, a "MB-days of risk" value may be calculated based on the size of each file and the timing associated with backups (e.g., multiplying file size by days between backups). The MB-days of risk value provides for a more accurate representation of the amount of work that would be lost if the lost file required a restoration from the backup. In some embodiments, MB-days of risk values may be indicated in the desired backup configuration specified in the organization's backup policy 118 and/or may be compared with the MB-days of risk values calculated by the backup data calculation logic 403 for the current backup configurations.

One embodiment of the data protection logic 115A also includes report generation logic 401 to generate reports with the backup data or selected portions thereof, including the data generated by the backup data calculation logic 403. The reports may be accessed via an API 410 exposed by the data protection logic 115A be displayed by apps/GUIs 420 of external computing devices 490 (e.g., desktop computers, mobile devices, etc, of administrators). By way of example, and not limitation, a report may include the MB-days of risk values organized in meaningful ways (e.g., such as by department, device type, data type, etc). For example, one report may include an indication of unprotected and under-protected state items in multiple formats including a table structure which is sortable by any field in the report, including MB-days of exposure. Colors may be used in the report to highlight how exposed a particular item of data or type of data is and a heat-map of the organization may be used to display different levels of risk of exposure. In some embodiments where the administrator of one of the multiple backup services (e.g., backup service 190) does not have access to the endpoint management service 110, the report generation logic 401 may generate an email or other electronic message to the administrator with the report (or a link to the report), allowing the administrator to review and potentially act on the results.

In some embodiments, hyperlinks or other elements are included to enable actions with respect to the current backup configuration. By way of example, and not limitation, hyperlinks in the report and/or in the electronic message sent to the administrator may be commands directed to the APIs of one or more backup service providers, instructing changes to the current backup configuration based on the results highlighted in the report (e.g., to add or remove certain data items and/or to adjust the backup schedule for certain data items). In some embodiments, the report is used to support or make claims with respect to compliance requirements for backing up critical data. For example, the report may be configured with additional hyperlinks to record or submit these compliance claims (e.g., to a local or a third party service).

In some embodiments, to reduce the amount of data needed for managing backups as described herein, the backup "state" may be tracked and managed using "volumes" or other data granularities larger than files and folders. For example, on Windows platforms, backup data may be expressed and managed with respect to the C; and D: drives. With respect to UNIX-family platforms such as Linux and BSD, the granularity may be mounted volumes such as/usr and/u.

Given that certain types of data will not need to be backed up, the data protection logic 115A and/or 115B$_{1-4}$ may include smart filtering logic 402 to perform filtering to exclude certain data from the desired backup configuration. This may include, for example, system files such as the content in C:WindowsSystem32 and application program code contained in locations such as C:/Program Files and/or other types of files which are not typically modified by a user. Additionally, the smart filtering logic 402 can identify and exclude confidential or privileged data, or other forms of data which contain sensitive information. The smart filtering logic 402 can also identify and prioritize backing up confidential or privileged data which as is likely "important".

One embodiment of the data protection logic 115A includes a machine learning engine 407 configured to monitor the various operations and results and responsively made adjustments based on a particular machine-learning model. By way of example, and not limitation, the machine learning engine 407 may track the data being updated, the files being added, and files being deleted by users across the network. Based on this information, the machine learning engine 407 may adjust the scope of "important" data to be included in the desired backup configuration. For example, files which are being modified frequently by users may be added to the important data. In one embodiment the machine learning engine 407 periodically updates the data backup policy 118 based on its analysis.

In some embodiments, the data protection logic 115A (e.g., the machine learning engine 407 and/or smart filtering logic 402) scans for unprotected and under-protected endpoint data with sensitive content which should therefore be backed up. For example, the data protection logic 115A may scan for certain strings such as internal codes and/or text labels such as "confidential" and "privileged" and then perform one or more of the operations described herein to ensure that this data is backed up within a reasonable time period.

Thus, embodiments of the invention may be implemented centrally (e.g., from a management server on premises or in the cloud), on the endpoints, or using a combination of centralized and endpoint operations. For example, in FIG. 1A, backup integration is implemented by the data protection logic 115A and different backup service interfaces (e.g., such as interface 120) allowing connection to a variety of backup service providers (e.g., such as backup service 190). Alternatively, or additionally, data protection logic 115B$_{1-4}$ executed on each endpoint 100A-D (in accordance with the endpoint management system), can perform operations to ensure that any data being missed is included in subsequent backups.

In one embodiment, each instance of the data protection logic 115B$_{1-4}$ may independently identify the "important" data on its respective endpoint 100A-D and compare its view of important data to the set of drives, volumes, folders, files, and/or larger constructs (e.g., a database, a VM, etc.), currently being backed up, which may be determined by reading the corresponding configuration file 106A-D. Each instance of the management software 192A-D may then transmit a message indicating these differences to the data protection logic 115A, which can then configure changes to the data backups.

Alternatively, or additionally, the data protection logic 115A may determine the current set of volumes, folders, and/or files being backed up for each endpoint by communicating with the backup service provider 190 (in accordance with the service provider's API 196) and provide an endpoint-specific list of these volumes, folders, and/or files to each individual endpoint, which compares the list with its view of the desired data to identify data being missed by the backup. Alternatively, or additionally, the data protection logic 115A may determine both the desired data and the current backup list for each endpoint, identify the data being missed by the backup, and communicate this information to each individual endpoint 100A-D and/or the data backup service 190.

In one embodiment, the management system dynamically tailors its operation based on the identity of the backup provider 190, the types of endpoints 100A-D being managed, the types of data for which a backup is required, and/or other variables.

These embodiments provide a unique combination of platform interoperability (i.e., techniques for seamlessly integrating backup services into existing endpoint management architectures) and data protection (i.e., determining which of the desired data is not being backed up and performing a comparison to determine the delta) using various combinations of endpoints 100A-D, the endpoint management service 110, and backup services 190. For example, in one embodiment, interoperability functions are implemented in the endpoints 100A-D and/or the endpoint management service 110. If the backup service 190 is configured to participate, interoperability may be performed by a combination of the endpoints 100A-D and the backup service 190, the management service 110 and the backup service 190, or a combination of all three.

In some embodiments which include interoperability and backup modification functions, the requirements for interoperability may depend on which entities are performing the backup enhancement operations. Put another way, how the endpoints 100A-D and/or management service 110 interoperate with different backup services 190 depends on the interface(s) provided by the backup service 110 and which of the operations the backup service 190 will perform as compared to the endpoints 100A-D and/or the management service 110. Thus, work may be performed on endpoints 100A-D, the management service 110, the backup services 190 or any combination thereof. As one example, the management service 110 may push a list of files being backed up to a network neighborhood comprising a particular linear chain of endpoints 100A-D, asking each endpoint, in turn, to identify any local files that are not protected, or are under-protected (have been updated since they were backed up). The endpoints that have unprotected files return that list in the aggregated response message to the management server 110.

The backup data may be specified in the data backup requirements 218 and backup configuration files 106A-D at various levels of granularity including, but not limited to, storage drives, volumes, file system folders and files, and/or application-specific data constructs (e.g., databases, database record, virtual machines, containers, etc). Moreover, different backup processes may be used for these different types of data.

Some embodiments collect overall statistics from the various endpoints 100A-D such as the number of files modified but not backed up and the average length of time since the last backup. The data protection logic 115A in these embodiments may evaluate the statistics and responsively update the data backup requirements 218. For example, if a particular set of data is being modified frequently or is otherwise being backed up too infrequently, the remediation logic 220 may increase the frequency by updating the backup configuration files 106A-D and/or send a request to the backup service 190 to increase the frequency.

In some implementations, the management service 110 is a Cloud-based service which provides endpoint management for endpoints distributed across various interconnected networks. In some implementations described here, the networks and associated endpoints are all associated with a particular organization (e.g., the networks are subsets of a distributed enterprise network) which uses the management functions provided by the management service 110 to manage endpoints connected to its networks. In some implementations, the management functionality provided by the management service 110 may be used by multiple different organizations to manage endpoints on multiple corresponding enterprise networks. In such cases, the visibility of the various networks and associated endpoints is limited based on the organization (e.g., administrators associated with a particular organization will only have access to the networks and endpoints associated with the organization).

The linear chain interface 130A may transmit different types of request messages 160A for endpoint data from different endpoints, e.g., requesting specific types of data from specific endpoints and/or requesting the same set of data from each endpoint in each chain. The request message 160A can be a query message causing the management software 192A-D on each managed endpoint 100A-D to perform a separate query to collect local data, which is then accumulated with data from previous endpoints in the chain and passed in a message to the next endpoint in the chain.

The management software 192A-D can be implemented such that the sequence of managed endpoints 100A-D in the linear chain is self-forming. For example, the management software 192A-D may implement a discovery protocol to identify all other instances of the management software 192A-D running within the network 105A or within a particular subnetwork of the network 105A (e.g., within a network "neighborhood" defined based on assigned network addresses). Once identified, the different instances of the management software 192A-D communicate to determine the order of managed endpoints 100A-D in the linear chain. The management software 192A-D can also dynamically adjust to incorporate new managed endpoints into the chain (e.g., when a new endpoint is added to the network or a subnetwork thereof) and when existing endpoints are removed from the chain (e.g., any of managed endpoints 100A-D). When a new linear chain is established and/or when an existing linear chain is changed, one of the managed endpoints 100A-D may transmit a message to the linear chain interface 115 to confirm the current set of managed endpoints included in the linear chain.

In some implementations, the linear chain is configured with a "head", "front-end", or "forward leader" endpoint, such as endpoint 100A, and a "tail", "back-end", or "backward leader" endpoint, such as endpoint 100D. The request message 160A is sent to the front-end endpoint 100A and, responsive to the message, the front-end endpoint 100A performs a local scan and adds data to the message 170 in accordance with the request message 160A. At this stage, the collected data only includes data from the front-end endpoint 100A. The message 170A is then forwarded to the next endpoint 100B in the sequence, which may perform the requested operations to add data to the message 170B; as such, the message 170 accumulates data from each endpoint 100A-D as it is sent along the linear chain until it arrives at the back end endpoint 100D which performs the requested operations, accumulates the data and transmits the response message 161A back to the linear chain interface 130A with the data from all endpoints 100A-D in the chain. Consequently, each of the managed endpoints 100A-D receiving a message 170 from its upstream neighbor acts upon the message by providing an update to the message based on its local state, performing some aggregation of the information in the message (e.g., by adding to or modifying aggregated results already included in the message as received from its upstream neighbor), and/or forwarding the message to its downstream neighbor along the linear chain (or to the linear chain interface 130A as a response 160B if it is the back-end endpoint 100D). Thus, there is a respective communication channel formed (e.g., a packet-based channel) between each pair of the endpoints 160A-D in the sequence. In some implementations, a similar sequential approach is used, but the back-end endpoint 100D sends the response message 160B back to the front-end endpoint 100A, which forwards the response message 160B back to the management interface.

While in some embodiments the messages indicate both the checks to be performed on respective endpoints 100A-D (e.g., particular operations to generate result data, specific persistent or previously-collected data, etc) and the data to be included in the response, other embodiments operate differently. For example, different checks may be indicated in different messages (e.g., each check in a separate message, subsets of the checks in the assessment into different messages). As another orthogonal example, some embodiments use message(s) to distribute the checks (sometimes referred to as check messages, assessment messages, distribution messages, question messages, or query messages) and subsequent messages to collect the responses (referred to as response messages, collection messages, answer collection messages, or report messages). These response message may traverse the linear chain of endpoints 100A-D in the same or opposite direction as the check messages (e.g., the software 192A-D may be configured to forward messages differently based on the message type).

In some embodiments, while queries are passed from electronic device to electronic device along a linear communication chain, individual queries can be directed to or targeted to a subset of the endpoints 100A-D in the linear communication chain, so that only a specified subset of the electronic devices in the linear chain process and update the message with requested data.

In some embodiments, the self-forming aspect of the linear chain may be implemented via: 1) an endpoint that acts as a server and that facilitates the creation and maintenance of one or more of the linear chains (e.g., an elected one of the managed endpoints 100A-D); and/or 2) the management software 192A-D on each of the endpoints 100A-D, respectively, executes a process based on a set of predetermined organization rules that causes each endpoint to find its immediate neighbors and coordinate with these immediate neighbors to self-organize into a linear chain. In this implementation, the "immediate" neighbors may be based on the network addresses assigned to each endpoint device 100A-D. For example, in a numerical addressing scheme such as TCP/IP, the "immediate" neighbors of an endpoint may be the endpoints with network addresses numerically closest to the endpoint's network address (e.g., the nearest neighbors of 192.168.0.4 being 192.168.0.5 and 192.168.0.3). As mentioned, the linear chain may grow or shrink as endpoints join and leave network 105A through the independent local actions of the endpoints themselves. When a nearest neighbor of an endpoint leaves the network, the endpoint updates its linear chain connection information to route messages to a new nearest neighbor.

Example Electronic Devices and Environments

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, endpoints, or end user devices; or more specifically referred to as mobile devices, desktops, desktop computers, workstations, laptops, personal digital assistants, smartphones, wearables, augmented reality (AR) devices, virtual reality (VR) devices, mixed reality (MR) devices, embedded devices, Internet-of-Things devices (e.g., cameras, lighting, refrigerators, security systems, smart speakers, and thermostats), etc. The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5:
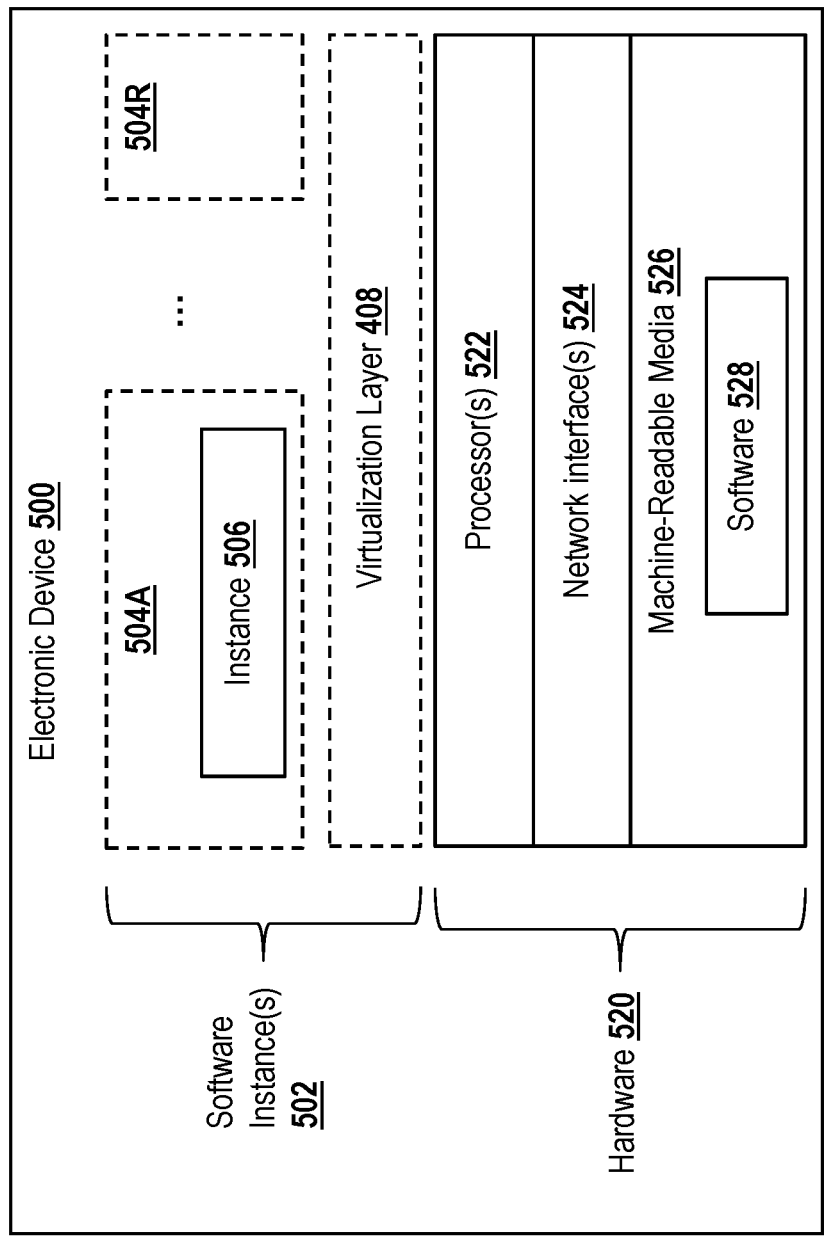
FIG. 5 illustrates an example electronic device on which embodiments of the invention may be implemented.

FIG. 5 is a block diagram illustrating an electronic device 500 according to some example embodiments. FIG. 5 includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. In the electronic devices 586 of FIG. 1A that include client software (e.g., the above-described client software 192 and/or the below-described client software 588), the software 528 represents that software. In electronic devices used to implement the cloud service(s) 542, the software 524 represents the software to implement the cloud service(s) 542.

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative embodiments of an electronic device may have numerous variations from that described above. For example, customized hardware and/or accelerators might also be used in an electronic device.

A linear chain (LC) (also referred to as a "linear orbit") is a set of interconnected endpoint devices (i.e., with an installed management client) which participate in a management protocol of a management service.

A linear chain interface (LCI) is an interface of a server designed to communicate with linear chains in accordance with a linear chain protocol.

A management client is client software installed on an endpoint to cause it to participate in a particular management protocol; a linear chain (LC) client is one example of a management client when using a linear chain architecture.

An endpoint refers to any electronic device coupled to a network, including electronic devices running client software (e.g., end user computing devices) and electronic devices running server software (e.g., a server operated to support a particular service).

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A set of one or more non-transitory machine-readable storage media that provides instructions that, when executed, are configured to cause operations comprising:
responsive to identification of one or more backup services configured to perform data backups for a plurality of endpoints, causing, by an endpoint management service (EMS) implemented by an electronic device executing some of the instructions, a verification that the one or more backup services is operating in accordance with data backup requirements, wherein the data backup requirements are expressed at a particular granularity or a particular set of granularities including endpoint storage drives, storage volumes, folders, files, or any combination thereof, wherein the one or more backup services belong to a plurality of third-party backup services for which the EMS is configured to automatically integrate with, wherein the EMS manages the plurality of endpoints with at least one management interface in accordance with at least one management protocol, the verification, for at least a first of the one or more backup services, comprising:
storing one or more files on a first endpoint of the plurality of endpoints at the particular granularity or the particular set of granularities indicated for portions of data backups by the first of the one or more backup services;
determining a difference between a set of data being backed up by the first of the one or more backup services for the first endpoint of the plurality of endpoints and those of the data backup requirements applicable to the first endpoint, the difference indicating a portion of data of the first endpoint not included in the set of data being backed up, the difference detected based on whether the one or more files is present in the set of data; and
automatically adding the portion of data to the set of data being backed up by the first of the one or more backup services, wherein adding the portion of data is performed with operations selected based on the first of the one or more backup services.

2. The set of non-transitory machine-readable media of claim 1, wherein the determining comprises:
comparing, by a second electronic device executing some of the instructions and operating as the first endpoint, the set of data being backed up by the first of the one or more backup services those of the data backup requirements applicable to the first endpoint.

3. The set of non-transitory machine-readable media of claim 1, verification comprising:
determining the set of data being backed up by the first of the one or more backup services for the first endpoint by performing at least one of:
reading a backup configuration file associated with the first endpoint of the plurality of endpoints, the backup configuration file indicating the set of data; and
requesting and receiving an indication of the set of data from the first of the one or more backup services.

4. The set of non-transitory machine-readable media of claim 3 wherein automatically adding the portion of data to the set of data being backed up comprises performing at least one of:
writing an indication of the portion of data to the backup configuration file associated with the first endpoint of the plurality of endpoints; and
transmitting an indication of the portion of data to the first of the one or more backup services.

5. The set of non-transitory machine-readable media of claim 2, the verification comprising:
normalizing the indication of the set of data in accordance with a data format used to indicate the backup requirements for each endpoint.

6. The set of non-transitory machine-readable media of claim 3 wherein reading the backup configuration file associated with the first endpoint of the plurality of endpoints comprises transmitting, by the EMS, one or more requests to read the backup configuration file, the one or more requests transmitted in accordance with a first management protocol of the at least one management protocol.

7. The set of non-transitory machine-readable media of claim 6 wherein the first management protocol comprises a linear chain protocol or a direct endpoint connection protocol.

8. The set of non-transitory machine-readable media of claim 3 wherein requesting and receiving the indication of the set of data from the first of the one or more backup services comprises transmitting a request to an application programming interface (API) exposed by the first of the one or more backup services and receiving the indication of the set of data from the API.

9. The set of non-transitory machine-readable media of claim 3 wherein determining the set of data being backed up by the first of the one or more backup services for the first endpoint further comprises: detecting data in network-attached storage (NAS) or other network device which is incapable of independently supporting management software by scanning for network-mounted storage on the first endpoint.

10. The set of non-transitory machine-readable media of claim 3 the operations comprising:
generating, by the EMS, data backup metrics based on the set of data being backed up by the one or more backup services.

11. The set of non-transitory machine-readable media of claim 10 wherein the data backup metrics includes at least one metric based on a combination of an amount of data and an amount of time.

12. The set of non-transitory machine-readable media of claim 11 wherein the at least one metric comprises megabyte-days of risk values or gigabyte-days of risk values calculated based on data size and timing associated with current backups.

13. The set of non-transitory machine-readable media of claim 12 the operations comprising:
generating, by the EMS, reports with the data backup metrics including the megabyte-days of risk values or gigabyte days of risk values; and
providing, by the EMS, access to the reports via an application programming interface (API).

14. The set of non-transitory machine-readable media of claim 13 wherein the reports are configured with different colors to highlight how exposed a particular item of data or type of data is and/or to provide a heat-map indicating different levels of risk of exposure for the different items of data or types of data.

15. The set of non-transitory machine-readable media of claim 13 wherein hyperlinks or other selectable elements are included in the reports to enable backup configuration actions including automatically adding the portion of data to the set of data being backed up by the one or more backup services.

16. The set of non-transitory machine-readable media of claim 13 wherein the report is configured to support or make claims with respect to compliance requirements for backing up critical data.

17. The set of non-transitory machine-readable media of claim 1 wherein:
the one or more backup services comprise a plurality of backup services;
the determining the difference is part of determining differences between data being backed up by any of the plurality of backup services and the data backup requirements, the differences indicating data not included in the data being backed up; and
the automatically adding the portion of data is part of automatically adding to the data being backed up the data not included in the data being backed up, wherein the automatically adding to the data being backed up the data not included in the data being backed up is performed with operations selected based which one or more of the plurality of backup services being configured to back up one or more parts of the data not included in the data being backed up.

18. The set of non-transitory machine-readable media of claim 17 wherein the plurality of endpoints comprise endpoints associated with an organization that is a customer of the EMS.

19. The set of non-transitory machine-readable media of claim 1 wherein the particular granularity or particular set of granularities includes specified portions of storage volumes.

20. The set of non-transitory machine-readable media of claim 1 the operations comprising:
performing filtering operations to exclude certain data from the data backup requirements for the first endpoint.

21. The set of non-transitory machine-readable media of claim 20 wherein the excluded data includes specific folders containing system files.

22. The set of non-transitory machine-readable media of claim 1 wherein the verification further comprises scanning for confidential data, privileged data, and/or data containing sensitive information that should be backed up.

23. The set of non-transitory machine-readable media of claim 22 wherein scanning for confidential data, privileged data, and/or data containing sensitive information comprises searching for specified text strings and/or internal codes.

24. The set of non-transitory machine-readable media of claim 1 the operations comprising:
collecting information related to operations performed on endpoints; and
performing machine learning operations based on the information to modify the data backup requirements.

25. The set of non-transitory machine-readable media of claim 24 wherein the information includes information related to data being updated on the endpoints, the files being added on the endpoints, and files being deleted by users on the endpoints.

26. A method performed responsive to execution of code, the method comprising:
responsive to identification of a particular backup service configured to perform data backups for a plurality of endpoints, causing, by an endpoint management service (EMS) implemented by an electronic device executing some of the code, a verification that the particular backup service is operating in accordance with data backup requirements, wherein the data backup requirements are expressed at a particular granularity or a particular set of granularities including endpoint storage drives, storage volumes, folders, files, or any combination thereof, wherein the particular backup service belongs to a plurality of third-party backup services for which the EMS is configured to automatically integrate with, wherein the EMS manages the plurality of endpoints with at least one management interface in accordance with at least one management protocol, the verification comprising:
storing one or more files on a first endpoint of the plurality of endpoints at the particular granularity or the particular set of granularities indicated for portions of data backups by the particular backup services;
determining a difference between a set of data being backed up by the particular backup services for the first endpoint of the plurality of endpoints and those of the data backup requirements applicable to the first endpoint, the difference indicating a portion of data of the first endpoint not included in the set of data being backed up, the difference detected based on whether the one or more files is present in the set of data; and automatically adding the portion of data to the set of data being backed up by the particular backup service, wherein adding the portion of data is performed with operations selected based on the particular backup service.

27. The method of claim 26 wherein the determining comprises:
comparing, by a second electronic device executing some of the code and operating as the first endpoint, the set of data being backed up by the particular backup service for the first endpoint and those of the data backup requirements applicable to the first endpoint.

28. The method of claim 26, the verification comprising:
determining the set of data being backed up by the particular backup service by performing at least one of:
reading a backup configuration file associated with the first endpoint of the plurality of endpoints, the backup configuration file indicating the set of data; and
requesting and receiving an indication of the set of data from the particular backup service.

29. The method of claim 28 wherein automatically adding the portion of data to the set of data being backed up comprises performing at least one of:
writing an indication of the portion of data to the backup configuration file associated with the first endpoint of the plurality of endpoints; and
transmitting an indication of the portion of data to the particular backup service.

30. The method of claim 29 the verification comprising:
normalizing the indication of the set of data in accordance with a data format used to indicate the backup requirements for each endpoint.

31. The method of claim 28 wherein reading the backup configuration file associated with the first endpoint of the plurality of endpoints comprises transmitting, by the EMS, one or more requests to read the backup configuration file to the first endpoint of the plurality of endpoints, the one or more requests transmitted in accordance with a first management protocol of the at least one management protocol.

32. The method of claim 31 wherein the first management protocol comprises a linear chain protocol or a direct endpoint connection protocol.

33. The method of claim 28 wherein requesting and receiving the indication of the set of data from the particular backup service comprises transmitting a request to an application programming interface (API) exposed by the particular backup service and receiving the indication of the set of data from the API.

34. The method of claim 28 wherein determining the set of data being backed up by the particular backup service for the first endpoint further comprises: detecting data in network-attached storage (NAS) or other network device which is incapable of independently supporting management software by scanning for network-mounted storage on the first endpoint.

35. The method of claim 28 further comprising:
generating, by the EMS, data backup metrics based on the set of data being backed up by the one or more backup services.

36. The method of claim 35 wherein the data backup metrics includes at least one metric based on a combination of an amount of data and an amount of time.

37. The method of claim 36 wherein the at least one metric comprises megabyte-days of risk values or gigabyte-days of risk values calculated based on data size and timing associated with current backups.

38. The method of claim 37 further comprising:
generating, by the EMS, reports with the data backup metrics including the megabyte-days of risk values or gigabyte days of risk values; and
providing, by the EMS, access to the reports via an application programming interface (API).

39. The method of claim 38 wherein the reports are configured with different colors to highlight how exposed a particular item of data or type of data is and/or to provide a heat-map indicating different levels of risk of exposure for the different items of data or types of data.

40. The method of claim 38 wherein hyperlinks or other selectable elements are included in the reports to enable backup configuration actions including automatically adding the portion of data to the set of data being backed up by the one or more backup services.

41. The method of claim 38 wherein the report is configured to support or make claims with respect to compliance requirements for backing up critical data.

42. The method of claim 26 wherein:
the determining the difference is part of determining differences between data being backed up by any of the plurality of third-party backup services and the data backup requirements, the differences indicating data not included in the data being backed up; and
the automatically adding the portion of data is part of automatically adding to the data being backed up the data not included in the data being backed up, wherein the automatically adding to the data being backed up the data not included in the data being backed up is performed with operations selected based which one or more of the plurality of third-party backup services is being configured to back up one or more parts of the data not included in the data being backed up.

43. The method of claim 42 wherein the plurality of endpoints comprise endpoints associated with an organization that is a customer of the EMS.

44. The method of claim 26 wherein the particular granularity or particular set of granularities includes specified portions of storage volumes.

45. The method of claim 26 further comprising:
performing filtering operations to exclude certain data from the data backup requirements for the first endpoint.

46. The method of claim 45 wherein the excluded data includes specific folders containing system files.

47. The method of claim 26 wherein the verification further comprises scanning for confidential data, privileged data, and/or data containing sensitive information that should be backed up.

48. The method of claim 47 wherein scanning for confidential data, privileged data, and/or data containing sensitive information comprises searching for specified text strings and/or internal codes.

49. The method of claim 26 further c comprising:
collecting information related to operations performed on endpoints; and
performing machine learning operations based on the information to modify the data backup requirements.

50. The method of claim 49 wherein the information includes information related to data being updated on the endpoints, the files being added on the endpoints, and files being deleted by users on the endpoints.

* * * * *